United States Patent
Grainger

(10) Patent No.: US 10,247,042 B2
(45) Date of Patent: Apr. 2, 2019

(54) FAN TRACK LINER

(71) Applicant: ROLLS-ROYCE PLC, London (GB)

(72) Inventor: Philip Stanley Grainger, Ryde (GB)

(73) Assignee: ROLLS-ROYCE PLC, London (GB)

( * ) Notice: Subject to any disclaimer, the term of this patent is extended or adjusted under 35 U.S.C. 154(b) by 364 days.

(21) Appl. No.: 14/908,981

(22) PCT Filed: Jul. 30, 2014

(86) PCT No.: PCT/GB2014/052343
§ 371 (c)(1),
(2) Date: Jan. 29, 2016

(87) PCT Pub. No.: WO2015/015208
PCT Pub. Date: Feb. 5, 2015

(65) Prior Publication Data
US 2016/0169048 A1    Jun. 16, 2016

(30) Foreign Application Priority Data
Jul. 30, 2013 (GB) .................................. 1313594.2

(51) Int. Cl.
*F01D 21/04* (2006.01)
*F01D 25/28* (2006.01)

(52) U.S. Cl.
CPC ........... *F01D 25/28* (2013.01); *F01D 21/045* (2013.01); *F05D 2220/36* (2013.01); *Y02T 50/672* (2013.01)

(58) Field of Classification Search
CPC ..................................................... F01D 21/045
See application file for complete search history.

(56) References Cited

U.S. PATENT DOCUMENTS

| | | | |
|---|---|---|---|
| 4,377,370 A * | 3/1983 | Porcelli | F01D 21/045 415/121.2 |
| 5,160,248 A | 11/1992 | Clarke | |
| 5,336,044 A | 8/1994 | Forrester | |
| 5,344,280 A | 9/1994 | Langenbrunner et al. | |
| 2004/0022625 A1 | 2/2004 | Care | |
| 2004/0141837 A1 | 7/2004 | McMillan et al. | |
| 2005/0089390 A1 | 4/2005 | Gerain et al. | |
| 2005/0201860 A1 | 9/2005 | Care | |
| 2008/0017442 A1* | 1/2008 | Douglas | B64D 33/02 181/213 |

(Continued)

FOREIGN PATENT DOCUMENTS

| | | |
|---|---|---|
| CN | 101163863 A | 4/2008 |
| CN | 103038456 A | 4/2013 |

(Continued)

OTHER PUBLICATIONS

Jul. 25, 2016—(CN) Office Action—App. No. 201480042777.2—12 pages.

(Continued)

*Primary Examiner* — Woody A Lee, Jr.
(74) *Attorney, Agent, or Firm* — Banner & Witcoff, Ltd.

(57) ABSTRACT

A containment arrangement for a gas turbine engine comprises: a radially outer annular casing (12); a fan track liner (28) radially within the casing comprising: an impact region (30) comprising a cellular material having a first compressive strength; at least one elongate ridge portion (26) extending through the impact region in a direction having an axial component, the ridge portion having a second compressive strength higher than the first compressive strength; and a gas-washed layer (38) radially within the fan track liner.

18 Claims, 6 Drawing Sheets

(56) References Cited

U.S. PATENT DOCUMENTS

Figure 1:
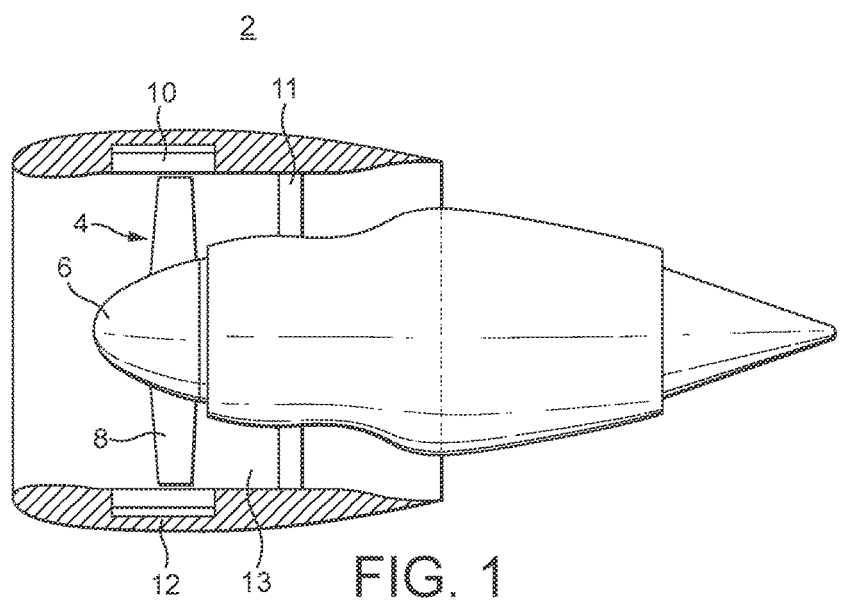

| | | |
|---|---|---|
| 2009/0214327 A1* | 8/2009 | Evans ............... F01D 21/045 |
| | | 415/9 |
| 2010/0031671 A1 | 2/2010 | Chehab et al. |
| 2010/0266384 A1 | 10/2010 | Evans et al. |
| 2011/0217156 A1* | 9/2011 | McMillan ........... F01D 21/045 |
| | | 415/9 |
| 2012/0034076 A1 | 2/2012 | Xie |
| 2012/0134774 A1* | 5/2012 | Clark ............... B65D 43/0222 |
| | | 415/9 |
| 2013/0071234 A1 | 3/2013 | Dimelow |

FOREIGN PATENT DOCUMENTS

| | | |
|---|---|---|
| EP | 1344895 A2 | 9/2003 |
| EP | 2767677 A1 | 8/2014 |
| FR | 2975735 A1 | 11/2012 |
| JP | H11230094 A | 8/1999 |
| JP | 2005509775 A | 4/2005 |

OTHER PUBLICATIONS

Sep. 26, 2014—(WO) International Search Report and Written Opinion—App No. PCT/GB2014/052343—10 pages.

Feb. 28, 2014—(GB) Search Report—App. No. GB1313594.2—4 pages.

May 7, 2014—(GB) Search Report—App. No. GB1313594.2—2 pages.

Feb. 6, 2018—(JP) Notice of Reasons for Rejection—App. No. 2016-530609—3 pages.

\* cited by examiner

FAN TRACK LINER

CROSS REFERENCE TO RELATED APPLICATIONS

This application is a National Stage Application under 35 U.S.C. § 371 of co-pending PCT application number PCT/GB2014/052343, filed 30 Jul. 2014; which claims priority to GB1313594.2, filed 30 Jul. 2013, both of which are hereby incorporated by reference in their entireties for any and all non-limiting purposes.

This invention relates to a fan blade containment arrangement for a turbofan engine.

Turbofan engines typically have a fan comprising a plurality of fan blades towards their upstream end. Each fan blade is connected to a central fan disc. In use, the fan is driven to rotate by a turbine stage of the engine. The rotational velocity of the fan imparts a large centrifugal load on each fan blade. In the rare event that a portion or the whole of a fan blade becomes detached from the fan disc, for example following a foreign object strike, the momentum of the blade causes it to travel radially outwardly at great velocity. This is known as a fan-blade-off event.

The fan blades have an aerodynamic profile designed to draw air into the engine. The aerodynamic forces on each blade can cause it to travel forwards of the engine if it becomes detached from the fan disc.

For safety reasons, it is desirable to prevent fan blade material from exiting the side or the front of the turbofan engine. Accordingly, turbofan engines are typically provided with a fan blade containment arrangement disposed circumferentially about the fan.

A known containment arrangement includes an outer casing and a honeycomb fan track liner. During a fan-blade-off event a detached fan blade, or a detached part of a fan blade, impacts the honeycomb fan track liner, which is compressed and/or crushed as it absorbs the energy of the impacting blade. One or more further blades of the fan may collide with the detached blade, which can cause the further blade or blades to break up and/or become detached. Fan blade material from the fan-blade-off event can be swept around the containment arrangement under its own momentum and/or by further blades of the fan impacting the fan blade material. The fan blade material may be ejected from the front of the engine, which may endanger the aircraft.

Turbofan engines are typically highly unbalanced after a fan-blade-off event, and this introduces lateral loads on the engine and into its supporting structure (i.e. the wing of an aircraft), which may damage the structure and further endanger the aircraft.

According to a first aspect of the invention there is provided a containment arrangement for a gas turbine engine, the containment arrangement comprising: a radially outer annular casing; a fan track liner radially within the casing comprising: an impact region comprising a cellular material having a first compressive strength; at least one elongate ridge portion extending through the impact region in a direction having an axial component, the ridge portion having a second compressive strength higher than the first compressive strength; and a gas-washed layer radially within the fan track liner.

The impact region may comprise two layers of cellular material including a radially outer layer comprising cellular material having the first compressive strength and a radially inner layer comprising cellular material having a third compressive strength less than the first compressive strength. There may be more than two layers of cellular material.

The containment arrangement may further comprise a septum layer disposed between the radially outer layer and the radially inner layer of the impact region. The septum layer may have a radial extent of between 1 mm and 10 mm. The septum layer may comprise composite material, for example, a glass or carbon fibre reinforced polymer (GFRP, CFRP). A composite material generally comprises two or more constituent materials having different material properties, for example, strength and ductility. A composite material may comprise a matrix material and a fibre reinforcement material.

The gas-washed layer may be an abradable layer. The abradable layer may have a radial extent of between 2 mm and 10 mm. The abradable layer may comprise a cellular material. The cellular material of the abradable layer may comprise an expanded, honeycomb structure. The cellular material may comprise aluminium, an aluminium alloy, titanium or a titanium alloy or a plastics material. The cellular material of the abradable layer may include an epoxy or other plastic material. For example, the voids within the cellular material may be at least partly filled with the epoxy or other plastic material, which may be granular in form. The plastic or epoxy material may provide the abradable layer with improved low impact resistance and wear resistance, for example, from ice and sand.

The ridge portion may be discontinuous. The ridge portion may comprise discrete ridge elements, which may be axially separated from one another. Alternatively, the ridge portion may be continuous.

The cross-section of the ridge portion may have any suitable shape. In one embodiment, the cross-section is substantially triangular. In other embodiments, the cross-section of the ridge portion may be substantially semi-cylindrical or substantially cuboid. The ridge portion may have a truncated shape to provide a flat radially inner surface. The ridge portion may have a ramp portion on one or both sides.

The axial extent of the ridge portion may be substantially equal to or less than the axial extent of the fan track liner. The ridge portion may extend substantially axially, but in some embodiments the ridge portion may be inclined to the axis of the casing, for example it may have a swept or helical configuration.

The fan track liner may comprise a plurality of panels, each panel forming an impact portion of the impact region. Each panel may comprise the cellular material having the first compressive strength. Each panel may comprise two layers of cellular material including a radially outer layer comprising cellular material having the first compressive strength and a radially inner layer comprising cellular material having a third compressive strength less than the first compressive strength. Each panel may comprise more than two layers of cellular material.

The ridge portion may be disposed between two adjacent panels. The ridge portion may be at least partly disposed in a recess formed in the impact portion of one of the panels. Two adjacent panels may be provided with edge recesses which define a void therebetween, which void accommodates the ridge portion. Alternatively, the ridge portion may be entirely disposed in a recess formed in the impact portion of one of the panels.

The ridge portion may have a radially inner edge which lies radially outwardly of the radially inner surface of the impact region.

The impact region and/or an impact portion of a fan track liner panel may have a radial extent of between 20 mm and 50 mm, of between 25 mm and 40 mm, or of between 30 mm and 35 mm.

The ridge portion may have a radial extent of between 10 mm and 40 mm, of between 15 mm and 30 mm, or of between 20 mm and 25 mm. The ridge portion may have a circumferential extent of between 10 mm and 50 mm, of between 15 mm and 35 mm, or of between 20 mm and 30 mm.

The cellular material of the impact region may comprise an expanded, extruded, and/or honeycomb structure. The cellular material may comprise aluminium, an aluminium alloy, titanium or a titanium alloy.

The ridge portion may comprise a cellular material. The cellular material of the impact region may comprise an expanded, extruded, and/or honeycomb structure. The cellular material of the ridge portion may comprise an expanded, extruded, and/or honeycomb structure. The cellular material may comprise aluminium, an aluminium alloy, titanium or a titanium alloy.

The fan track liner may comprise a plurality of ridge portions circumferentially spaced apart. In one embodiment there may be four ridge portions, but in other embodiments there may be more than four, for example up to twelve ridge portions.

According to a second aspect of the invention there is provided a gas turbine engine comprising: a fan comprising a plurality of fan blades; and a containment arrangement in accordance with the first aspect of the invention which extends around the fan blades.

Each fan blade may comprise composite material. Each composite fan blade may be provided with leading edge, trailing edge and/or tip metalwork.

Each fan blade may be composed of metal.

According to a third aspect of the invention there is provided a method of fan blade containment for a gas turbine engine in accordance with the second aspect of the invention, in which a fan-blade-off event occurs, in which method: (a) a detached blade or blade fragment is captured in the impact region; (b) circumferential displacement of the blade or blade fragment in the impact region excavates impact region material; (c) circumferential displacement of debris comprising the blade or blade fragment and the excavated impact region material is arrested by the ridge portion; (d) the debris projects into the path of un-detached fan blades; and (e) un-detached fan blades collide with the projecting debris and are thereby shortened.

Where the fan blade material comprises composite material and further comprises tip metalwork, the tip metalwork of each fan blade may become detached from the respective fan blade when the fan blade impacts the debris.

According to a fourth aspect of the invention there is provided a fan track liner panel for an annular fan track liner of a containment arrangement for a gas turbine engine, the fan track liner panel extending circumferentially and axially and comprising a cellular material, the fan track liner panel being provided with an elongate recess extending in a direction having an axial component, the recess being open on at least the outer radial surface of the panel and being configured to receive at least part of an elongate ridge portion of the fan track liner.

The recess may be an edge recess open on both the radially outer surface and a circumferential edge of the panel. The circumferential edges of the panel may extend substantially axially, but in some embodiments the circumferential edges of the panel may be inclined with respect to the axial direction of the fan track liner panel, for example they may have a swept or helical configuration.

The recess may be situated between the edges of the panel and may open at the radially outer surface of the panel.

The radial extent of the recess may be between 20 mm and 50 mm, of between 25 mm and 40 mm, or of between 30 mm and 35 mm.

The circumferential extent of the recess may be between 5 mm and 50 mm, of between 8 mm and 35 mm, or of between 10 mm and 30 mm.

The cross-section of the recess may have any suitable shape. In one embodiment, the cross-section is substantially triangular. In other embodiments, the cross-section of the recess may be substantially semi-cylindrical, quarter-cylindrical or substantially cuboid. The recess may have a truncated shape to provide a flat radially inner surface.

The recess and the ridge portion may have complementary cross-sections, such as substantially triangular cross-sections.

According to a fifth aspect of the invention there is provided a kit of parts for an annular fan track liner of a containment arrangement for a gas turbine engine, the kit of parts comprising: a plurality of fan track liner panels, each panel extending circumferentially and axially and comprising a cellular material of a first compressive strength so as to constitute an impact portion of an impact region of the fan track liner, at least one of the fan track liner panels having an elongate recess extending in a direction having an axial component, the recess being open on at least the outer radial surface of the panel and being configured to receive at least part of an elongate ridge portion; and an elongate ridge portion having a profile complementary to that of the recess and having a second compressive strength higher than the first compressive strength.

Each panel may be in accordance with the fourth aspect of the invention. There may be a plurality of ridge portions, and a plurality of the fan track liner panels may be provided with the recesses.

At least two of the panels may be arranged such that the respective recesses define a void therebetween when one panel is disposed adjacent to the other panel, the recesses being configured such that the void is complementary to the profile of the ridge portion so that the ridge portion can be received within the void.

The cross-section of the ridge portion may have any suitable shape. In one embodiment, the cross-section is substantially triangular. In other embodiments, the cross-section of the ridge portion may be substantially semi-cylindrical or substantially cuboid. The ridge portion may have a truncated shape to provide a flat radially inner surface. The ridge portion may have a ramp portion on one or both sides.

The ridge portion may be bonded to the respective fan track liner panel or panels.

At least one of the fan track liner panels may have no recess for receiving the ridge portion.

The invention may comprise any combination of the features and/or limitations referred to herein, except combinations of such features as are mutually exclusive.

Figure 2:
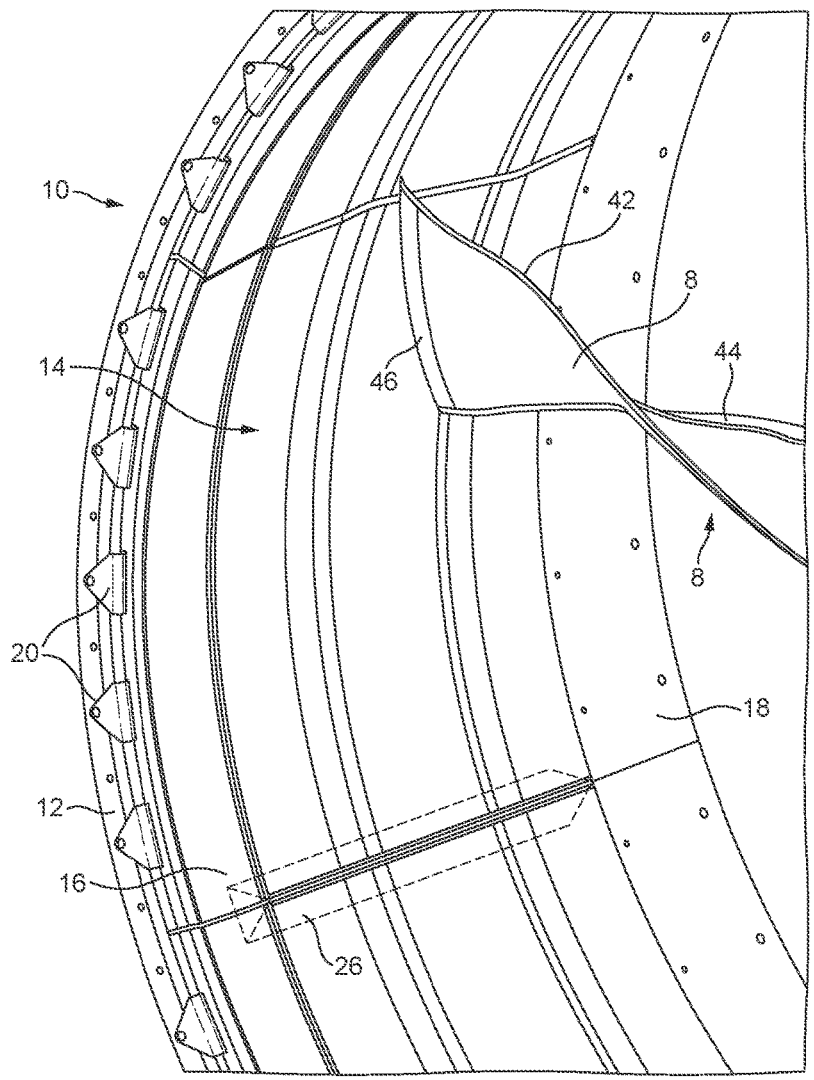
Figure 3:
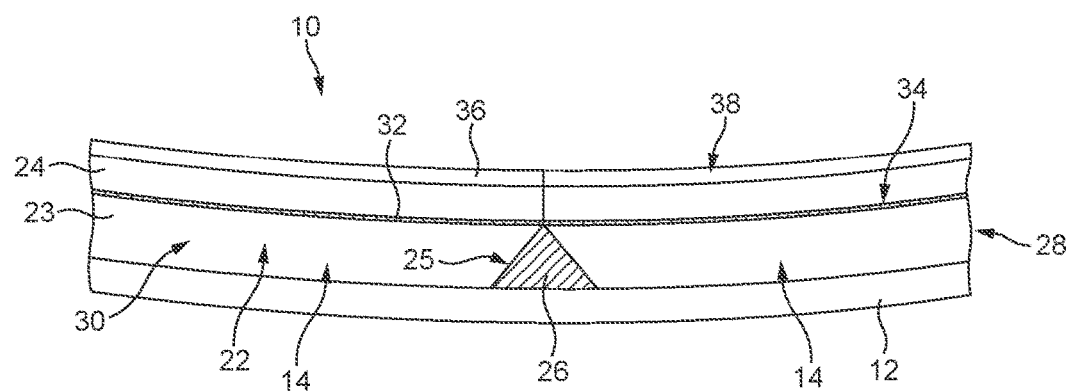
Figure 4:
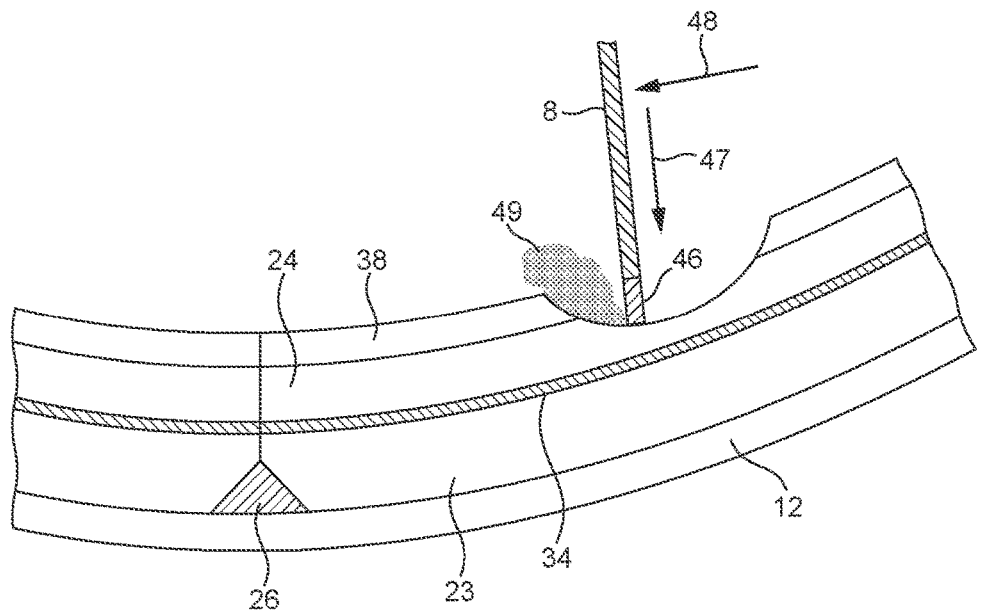
Figure 5:
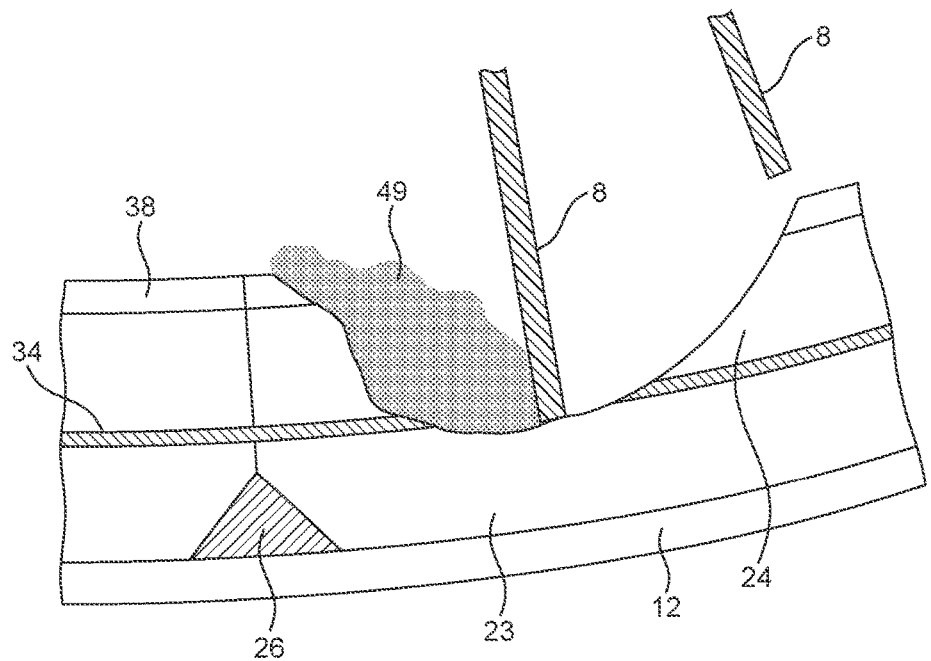
Figure 6:
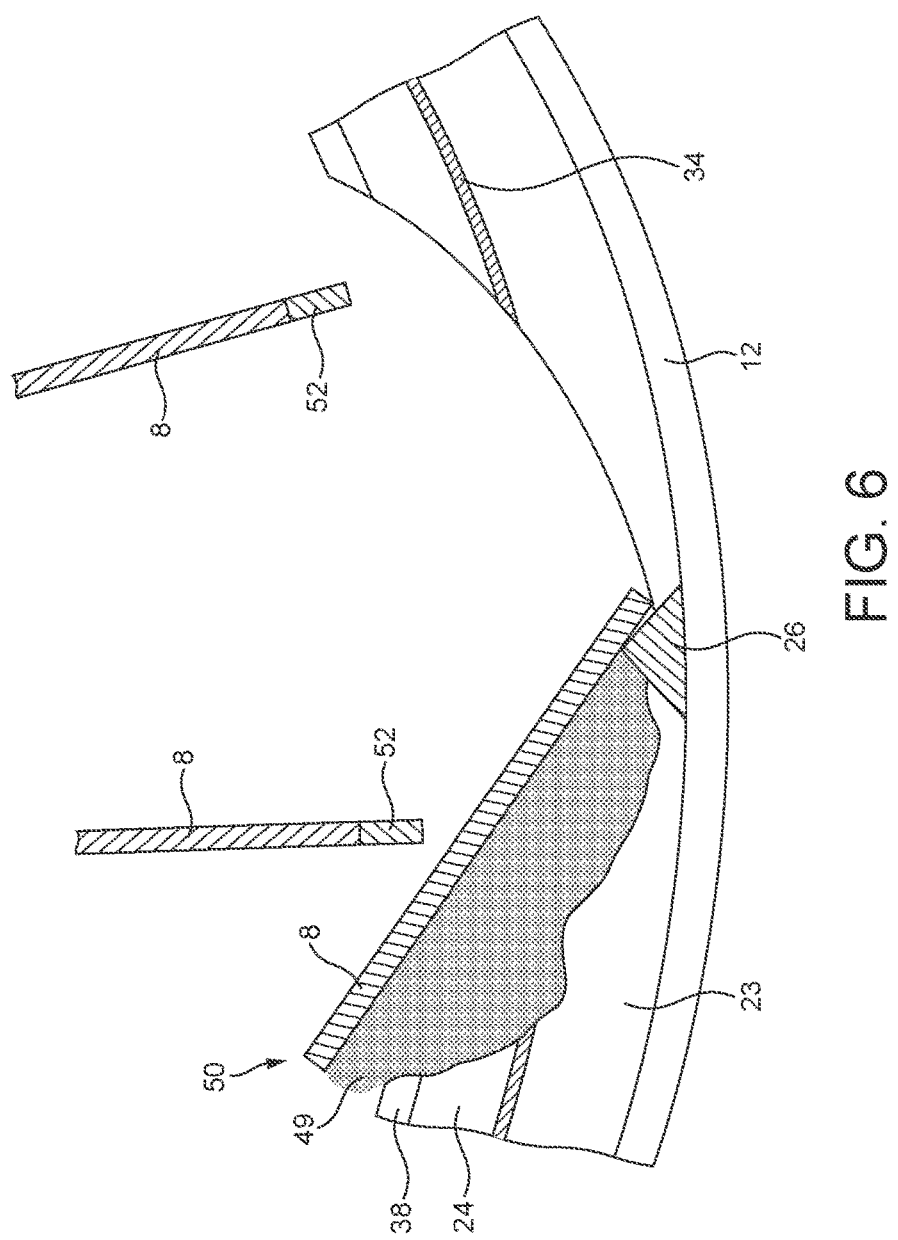
Figure 7:
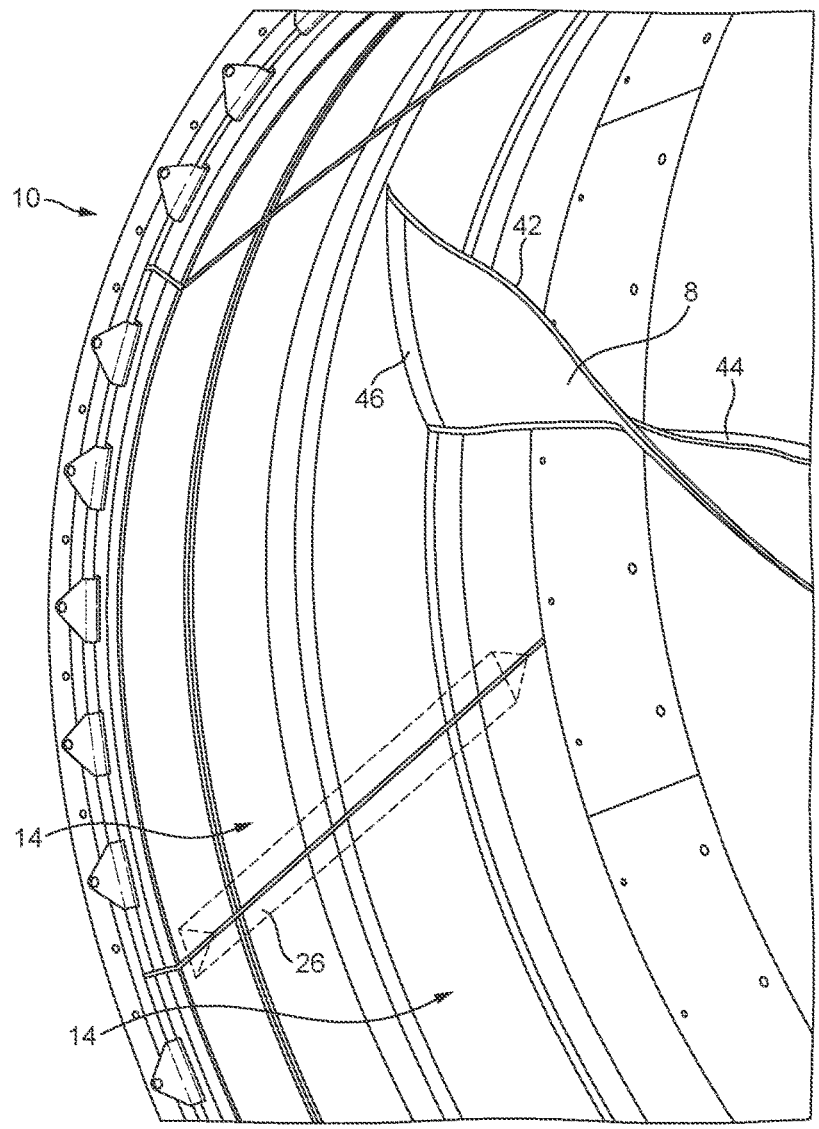

Embodiments of the invention will now be described, by way of example, with reference to the accompanying drawings, in which:

FIG. 1 schematically shows in perspective view a turbofan engine including a fan containment arrangement;

FIG. 2 is a schematic perspective view towards the radially inner surface of the containment arrangement of FIG. 1;

FIG. 3 schematically shows in cross-sectional view the containment arrangement of FIG. 2;

FIG. 4 corresponds to FIG. 3 but shows the containment arrangement of FIG. 2 during a first phase of a fan-blade-off event;

FIG. 5 corresponds to FIG. 3 but shows the containment arrangement of FIG. 2 during a second phase of the fan-blade off event;

FIG. 6 corresponds to FIG. 3 but shows the containment arrangement of FIG. 2 during a third phase of the fan-blade off event; and FIG. 7 corresponds to FIG. 2 but shows an alternative embodiment.

FIG. 1 shows a turbofan engine 2 having a fan 4 at its upstream end. The fan comprises a plurality of fan blades 8 extending from a disc 6 and is enclosed by a fan containment arrangement 10 including an annular fan casing 12. The engine 2 comprises an annular debris retention space 13 immediately downstream of the fan 4 and upstream of outboard guide vanes 11.

FIG. 2 shows the radially outer portion of a fan blade 8 adjacent the containment arrangement 10. The containment arrangement comprises the annular fan casing 12 and a plurality of containment panels 14, each panel 14 forming a segment of the containment arrangement 10. Each panel 14 is bonded to the casing 12. In this embodiment, there are eight panels.

The containment arrangement 10 further comprises forward and aft acoustically treated liners 16, 18 disposed forward and aft of the panels 14 and secured to the casing 12 by fasteners.

As shown in FIG. 3, each panel comprises a radially outer impact portion 22 composed of cellular material.

In this embodiment, the impact portion 22 comprises two layers 23, 24 of cellular material separated by a septum 34. The radially outer layer 23 is composed of medium density cellular material and the radially inner layer 24 is composed of a low density cellular material.

The medium density cellular material of the layer 23 is an extruded aluminium honeycomb material in which the cellular direction is aligned with the radial direction of the casing 12. The medium density cellular material has a compressive strength in the radial direction of between 14.5 MPa and 22.8 MPa. In a specific embodiment, the compressive strength is approximately 18.5 MPa, achieved using a medium density material with a cell size of approximately 3.2 mm in a direction transverse to the cellular direction and a density of approximately 190 kg/m$^3$.

The low density cellular material of the layer 24 has a lower compressive strength and a lower crush strength than the medium density cellular material. The low density cellular material has a compressive strength in the radial direction of between 2.4 MPa and 4.5 MPa. In a specific embodiment, the compressive strength is approximately 3.4 MPa, achieved using a low density material with a cell size of approximately 6.4 mm in a direction transverse to the cellular direction and a density of approximately 70 kg/m$^3$. In this embodiment, the radial extent of the impact portion 22 is approximately 32 mm, in which the radial extent of the radially outer layer 23 is approximately 20 mm and the radial extent of the radially inner layer 24 is approximately 12 mm.

The septum 32 is disposed between the radially outer layer 23 and the radially inner layer 24 of the impact portion 22. In this embodiment the septum 32 is composed of a composite material such as glass fibre reinforced polymer (GFRP) which is approximately 5 mm thick. The septum 32 is bonded to the radially outer and radially inner layers 23, 24.

The impact portion 22 is bonded or otherwise fastened to the casing 12. In the embodiments shown in FIGS. 3 to 6, the impact portion 22 has a recess 25 which is open both on the radially outer surface of the impact portion 22 and on one of its axially extending circumferential edges. In this embodiment, the recess 25 is in the form of a large edge chamfer, and so the recess 25 may be described as an edge recess. In this embodiment, the radial extent of the recess 25 is approximately 16 mm, and the circumferential extent of the recess 25 is approximately 12 mm. Accordingly, in this embodiment the recess 25 is formed in the radially outer layer 23 of the impact portion 22 only. However, it will be appreciated that in other embodiments the recess 25 may be formed in both the radially outer and the radially inner layers 23, 24 and so may extend across the septum 32.

As shown in FIG. 3, a pair of adjacent panels 14 are arranged such that the recesses 25 formed in the respective impact portions 22 define, together with the casing 12, a substantially triangular elongate void.

An elongate ridge portion 26 having substantially the same axial extent as the recesses 25 of the impact portion 22 is disposed within the void. The ridge portion 26 has substantially the same substantially triangular cross-sectional profile as the void defined by the recesses 25. In the assembled containment arrangement 10, the ridge portion 26 is bonded to the impact portion 22 and to the casing 12.

The ridge portion 26 is formed from a high density cellular material having a higher compressive strength than the cellular material of the impact portion 22 (i.e. higher than the compressive strength of both the radially outer and the radially inner layers 23, 24 of the impact portion 22). The cellular material is a high density extruded aluminium honeycomb in which the cellular direction is substantially aligned with the radial direction of the casing 12. The high density cellular material has a compressive strength in the radial direction of between 15 MPa and 90 MPa. In a specific embodiment, the compressive strength is approximately 35 MPa, achieved using a high density material having a cell size of approximately 1.6 mm in a direction transverse to the cellular direction and a density of approximately 320 kg/m$^3$.

The containment arrangement 10 comprises four pairs of adjacent panels 14 (eight panels 14 in total), and so there is a total of four substantially triangular elongate voids. Radially inwardly of the voids, the impact portions 22 of the adjacent panels 14 are in abutment with one another or aligned such that their side faces are substantially contiguous.

The impact portions 22 of the panels 14 and the four ridge portions 26 disposed therebetween form an annular fan track liner 28. The impact portions 22 of the respective panels form an impact region 30 of the fan track liner 28. The fan track liner 28 is predominantly composed of the impact region 30, and the ridge portions 26 extend through the impact region. The impact region 30 covers the ridge portions 26 on their radially inwards sides. The radially inner surface of the fan track liner 28 is defined by the radially inner surfaces of the impact portions 22 forming the impact region 30, and the radially outer surface of the fan track liner 28 is defined by the radially outer surfaces of the impact portions 22 and the ridge portions 26.

The plurality of septa 32 of the plurality of panels 14 together form an annular septum layer 34 embedded in the impact region 30 of the fan track liner 28.

Each panel 14 further comprises an abradable lining 36 disposed radially within the impact portion 22 and bonded or attached to the impact portion 22. In this embodiment the abradable lining 36 is composed of a cellular material such as an extruded aluminium honeycomb in which the cellular direction is aligned with the radial direction of the casing. The plurality of abradable linings 36 of the plurality of panels 14 together form an annular abradable layer 38 disposed radially inwardly of the fan track liner 28.

In this embodiment, as shown in FIG. 2, an aerofoil portion of each blade 8 predominantly comprises composite material, but is provided with leading edge and trailing edge protective metalwork 42, 44 that is bonded to the composite material and forms the leading edge and trailing edges of the blade 8 respectively. The leading edge and trailing edge metalwork 42, 44 is integrally formed with tip metalwork 46 which defines the tip of the fan blade 8 and is also bonded to the composite material of the aerofoil portion of the blade 8.

In use, the containment arrangement 10 is disposed around the fan 4 such that the abradable layer 38 defines the radially inner gas-washed surface of the containment arrangement 10. During initial operation of the engine 2, the fan blades 8 elongate under centrifugal force and wear a track in the abradable layer 38 to form a seal between the tip of the blade 8 and the abradable layer 38.

The containment arrangement 10 is designed to absorb debris so as to prevent debris from exiting the side or front of the engine 2. When small objects impact the containment arrangement 10, such as a bolt or minor runway debris deflected by a fan blade 8, the abradable layer 38 is typically penetrated and locally crushed, and the small object may enter the radially inner layer 24 of the impact region 30 and be retained therein. The septum layer 34 transmits the loads within the radially inner layer 24 over a larger area in the radially outer layer 23, which improves the resistance of the impact region 30 to crushing. If any small objects reach the septum layer 34, the septum layer may resist being penetrated and may deflect the objects back into the radially inner layer 24 of the impact region 30 where they may be retained.

Larger or high energy objects impacting the containment arrangement 10 will typically penetrate the septum layer 34 and begin to crush the radially outer layer of the impact region 30, but will also be retained within the impact region 30.

The medium density and low density cellular materials of the radially outer and radially inner layers 23, 24 of the impact region 30 are selected for compressive strength and crush strength properties that allow them to be penetrated, deformed, compressed and/or crushed whilst absorbing the energy of fan blade material in a fan-blade-off event. In contrast, the material of the ridge portion 26 is selected to resist such penetration, deformation, compression and/or crushing. In this embodiment, the ridge portion 26 is composed of high density cellular material, but in other embodiments other materials may be used, for example, solid aluminium.

As shown in FIGS. 4, 5 and 6, during a fan-blade-off event, a fan blade 8 or a part of a fan blade 8 becomes detached from the fan 2 and travels at high velocity in a radially outward and rotational direction, as indicated by arrows 47, 48. In an initial impact phase as shown in FIG. 4, the tip metalwork 46 impacts and penetrates the abradable layer 38 and the radially inner layer 24 of the impact region 30, and the rotational component of the blade motion begins to crush or excavate the impact region 30. For this purpose, the geometry of the tip metalwork 46 may be shaped to provide a cutting edge in the direction of rotation. The excavated material from the abradable layer 38 and the radially inner layer of the impact region in front of the blade (i.e. in the rotational path ahead of the blade) forms a debris field 49.

The blade or blade fragment 8 is swept along the fan case liner 14 by the following blade. As shown in FIG. 5, as the blade moves rotationally and radially outwardly through the impact portion, the radially inner layer 24 of the impact region 30 continues to be crushed or excavated and the blade 8 penetrates the septum layer 34 and begins to crush or excavate the radially outer layer 24 of the impact region 30. The impact of the blade 8 into the impact region 30 and the movement of the blade 8 through the impact region 30 applies compressive stress to both the impact region 30 and the fan blade 8. The composite blade undergoes a progressive modulus failure under the compressive load in which a tip portion of the blade 8 impacting the impact region 30 ruptures. Subsequently, the ruptured material from the fan blade 8 forms part of the debris field 49 and the remaining part of the blade continues to impact and crush or excavate the impact region 30 of the fan track liner 28. The continued impact again applies compressive stress to the blade 8, and again a further tip portion of the blade 8 impacting the impact region 30 ruptures. The progressive modulus failure of the blade 8 causes the blade 8 to shorten as it impacts and moves through the impact region 30. The ruptured material from the fan blade 8, together with ruptured material from the abradable liner 38, septum layer 34 and the inner and outer radial layers 23, 24 of the impact region 30 increase the debris field 49 forward of the remaining part of the detached fan blade 8.

As shown in FIG. 6, the reduced-length detached fan blade 8 continues to excavate and crush the radially outer layer 24 of the impact region, and eventually reaches the ridge portion 26. The compressive strength of the ridge portion 26 is sufficiently high to prevent the fan blade from penetrating, deforming, compressing and/or crushing it, and so the tip portion of the fan blade 8 is arrested by the ridge portion 26. Owing to the swept profile of the blade (see FIG. 2), the blade pivots about its radial axis as the tip of the leading edge of the fan blade 8 is arrested at the ridge portion 26. This causes the blade to rotate aft about the tip of the leading edge such that the blade 8 lies along a direction having an axial component. The banked sides of the ridge portion 26 allow the blade 8 to rotate and trip or topple over the ridge portion 26 in the aft direction. Large fragments of the fan blade 8 and the root of the blade may move aft into the debris retention space 13 shown in FIG. 1. The accumulated debris field 49, which may include the fan blade 8, forms a clod of debris 50 which is arrested in the containment arrangement and projects into the path of the remaining fan blades 8. In other words, the clod 50 projects radially inwardly of the notional radial position of the gas-washed surface of the containment arrangement 10, with the detached blade or blade fragment 8 lying close to the liner assembly.

As the fan 4 continues to rotate, the subsequent fan blades 8 impact the clod 50, which causes the clod 50 and the part of the fan track liner 28 in which it is embedded to be further compressed radially outwardly. As each subsequent fan blade 8 impacts the clod 50, a tip portion 52 of the fan blade 8 ruptures. Typically, the tip metalwork 46 of each following blade will impact the clod 50 and be broken off. The fractures in the following blades will occur within the composite material of the blade. The broken off tip portion 52 will either form part of the clod 50, be retained in the retention space 13 (FIG. 1) or be ingested into the engine.

After several rotations of the fan 4, the tip portions 52 of each of the blades 8 will have been detached from the blade 8 and each of the blades 8 will have been shortened in a controlled manner by substantially the same amount as each other. The fan 4 therefore has significantly reduced weight and a significantly reduced moment of inertia, which reduces the extent to which the engine is out of balance as a result of the total or partial loss of one or more fan blades.

Experimental results show that shortening the fan blades 8 in a fan-blade-off event as described above enables the extent by which the engine is out of balance when windmilling after the fan-blade-off event to be reduced by 60% from a typical values. The standard measure of engine imbalance after a fan-blade-off event is derived from the amount of blade material missing at the location of the event when compared with the amount of blade material at other locations about the fan, for example by evaluating the equivalent number of rotor blades by weight that are present around the fan.

The provision of a plurality of ridge portions 26 circumferentially spaced in the containment arrangement 10 ensures that a detached fan blade 8 (or a detached part of a fan blade 8) is bound to be arrested by one of the ridge portions 26 shortly after the blade is detached. The calculation of how many ridge portions may be required will primarily depend on the number of fan blades, the typical revolutions per minute of the respective fan blades, the speed at which the fan blades will travel through the impact region and numerous other factors.

Since the impact region extends over (i.e. radially inwardly of) the ridge portion, a detached fan blade 8 will always travel through at least some of the impact region before being arrested by a ridge portion 26.

References in the above description to a tip portion of a detached fan blade 8 are used to signify the radially outermost portion of the blade, whether fully intact or after removal of material. Thus, the meaning of "tip portion" is not confined to the original tip of the detached fan blade 8 or of a non-detached fan blade 8.

FIG. 7 shows an alternative embodiment of a containment arrangement which differs from that described above in that each ridge portion 54 is inclined with respect to the axis of the casing. In other words, the ridge portions 54 have a swept orientation or extend helically around the casing. In this embodiment the panels 14 have correspondingly inclined edges such that the ridge portion 54 can be received in edge recesses 25 of the panels. However, in other embodiments the panels 14 may have axially extending sides and inclined recesses extending therethrough.

In a fan-blade-off event, the inclined angle of the ridge portion 26 will direct large debris fragments and the root of the blade aft into the debris retention space 13 as they impact the ridge portion 54. Accordingly, this debris is prevented from migrating forwards to be ejected from the front of the engine. A debris field 49 and clod 50 will be formed as described above so as to shorten the length of fan blades following the or each detached fan blade 8.

Although embodiments of the invention have been described in which cellular material comprises extruded aluminium honeycomb material, it will be appreciated that other cellular materials may be used. For example, the cellular material may comprise an aluminium alloy, titanium or a titanium alloy. Further, the material may be expanded or it may be a foam or solid plastic.

Although it has been described that the ridge portion is disposed in a void defined by two recesses of adjacent panels, it will be appreciated that in other embodiments the ridge portion may be disposed in a single recess within one panel.

Although it has been described that the ridge portion and the corresponding recesses of the impact portion have substantially the same axial extent as the impact portion, the ridge portion and/or the corresponding recesses may have an axial extent less than the axial extent of the impact portion.

Although it has been described that the ridge portion is composed of a cellular material, it will be appreciated that in other embodiments the ridge portion may be made of any material having a compressive strength higher than the compressive strength of the impact portion. For example, the ridge portion may be composed of a solid piece of aluminium or a composite material.

Although embodiments of the invention have been described in which the ridge portion is a unitary length of continuous material, and in which the corresponding recess is a continuous channel for receiving the ridge portion, it will be appreciated that in other embodiments the ridge portion may be discontinuous and comprise discrete ridge elements which are arranged along an elongate line having an axial component of direction. For example, the ridge portion may comprise a plurality of small triangular ridge elements arranged in a row. It will also be appreciated that the recess may comprise a corresponding series of r discrete recesses.

I claim:

1. A containment arrangement for a gas turbine engine, the containment arrangement comprising:
 a radially outer annular casing;
 a fan track liner radially within the casing comprising:
  an impact region comprising a cellular material having a first compressive strength; and
  at least one elongate ridge portion extending through the impact region in a direction having an axial component, the ridge portion having a second compressive strength that is higher than the first compressive strength,
  wherein the fan track liner comprises a plurality of panels, each panel forming an impact portion of the impact region, wherein each panel comprises the cellular material having the first compressive strength, and wherein the at least one ridge portion is disposed between two adjacent panels; and
 a gas-washed layer radially within the fan track liner.

2. A containment arrangement according to claim 1, wherein the impact region comprises a radially outer layer comprising the cellular material having the first compressive strength and a radially inner layer comprising a second cellular material having a third compressive strength that is less than the first compressive strength.

3. A containment arrangement according to claim 2, further comprising a septum layer disposed between the radially outer layer and the radially inner layer of the impact region.

4. A containment arrangement according to claim 1, wherein the gas-washed layer is abradable.

5. A containment arrangement according to claim 1, wherein a cross-section of the ridge portion is substantially triangular.

6. A containment arrangement according to claim 1, wherein an axial extent of the ridge portion is substantially equal to the axial extent of the fan track liner.

7. A containment arrangement according to claim 1, wherein the ridge portion has a radially inner edge which lies radially outwardly of a radially inner surface of the impact region.

8. A containment arrangement according to claim 1, wherein at least part of the ridge portion is disposed in a recess formed in the impact portion of at least one of the panels.

9. A containment arrangement according to claim 1, wherein two adjacent panels are provided with edge recesses which define a void there between, which void accommodates the ridge portion.

10. A containment arrangement according to claim 1, wherein the ridge portion comprises a cellular material.

11. A containment arrangement according to claim 1, wherein the fan track liner comprises a plurality of ridge portions circumferentially spaced apart.

12. A fan track liner panel for an annular fan track liner of a containment arrangement for a gas turbine engine, the fan track liner panel forming an impact portion of an impact region of the fan track liner, and the panel comprising:
 a body portion extending circumferentially and axially and comprising:
  a cellular material having a first compressive strength; and
  an elongate recess extending in a direction having an axial component, the recess being open on at least the outer radial surface of the panel and being configured to receive at least part of an elongate ridge portion of the fan track liner, such that the elongate ridge portion is disposed between the panel and an adjacent panel also comprising the cellular material having the first compressive strength.

13. A fan track liner panel according to claim 12, wherein the recess is formed at one edge of the panel.

14. A fan track liner panel according to claim 12, wherein edges of the panel extend substantially axially.

15. A fan track liner panel according to claim 12, wherein edges of the panel are inclined with respect to an axis of the fan track liner.

16. A fan track liner panel according to claim 12, wherein the elongate ridge portion is situated within the recess.

17. A fan track liner panel according to claim 16, wherein the recess and the ridge portion have complementary substantially triangular cross-sections.

18. A gas turbine engine having a containment arrangement comprising:
 an annular fan track liner comprising a plurality of circumferentially arranged fan track liner panels, wherein each fan track liner panel comprises:
  an impact portion comprising a cellular material of a first compressive strength;
  a first edge and a second edge on opposite sides of the fan track liner panel, wherein the first edge and the second edge each have an axial component; and
  an edge recess provided by each of the first edge and the second edge;
 a plurality of voids, each void formed by the edge recesses of a pair of adjacent fan track liner panels; and
 a plurality of elongate ridge portions, each disposed in a void and extending in a direction having an axial component, wherein each elongate ridge portion has a second compressive strength higher than the first compressive strength.

* * * * *